United States Patent [19]
Kitai et al.

[11] 3,854,143
[45] Dec. 10, 1974

[54] SHUTTER OPERATING MECHANISM

[75] Inventors: Kiyoshi Kitai; Yukio Morino, both of Tokyo, Japan

[73] Assignee: Seiko Koki Kabushiki Kaisha, Tokyo, Japan

[22] Filed: July 5, 1973

[21] Appl. No.: 376,826

[30] Foreign Application Priority Data
July 4, 1972 Japan............................ 47-78343

[52] U.S. Cl. ............................... 354/265, 354/258
[51] Int. Cl. ............................................ G03b 9/14
[58] Field of Search ........ 95/62; 354/258, 262, 264, 354/265

[56] References Cited
UNITED STATES PATENTS
3,722,392   3/1973   Kitai ..................................... 95/62

*Primary Examiner*—Samuel S. Matthews
*Assistant Examiner*—Michael L. Gellner
*Attorney, Agent, or Firm*—Robert E. Burns; Emmanuel J. Lobato; Bruce L. Adams

[57] ABSTRACT

A shutter-operating mechanism which has an actuating lever for actuating the shutter blades and a holding lever coaxially disposed. The holding lever is releasably held in a cocked condition by an electromagnet and cooperates with a driving cam, which drives the actuating lever and is pivotally mounted thereon, in shifting its point of rotation to a fixed fulcrum for effecting a planetary gear-like movement in actuating the shutter blades. The axis of the actuating lever and holding lever, the fixed fulcrum, and the point of contact of the holding lever and the driving lever in executing the shift of the point or axis of rotation of the driving levers lie in a common plane during the opening and closing of the shutter blades thereby reducing the sliding contact between elements and minimizing the loss of force due to friction.

6 Claims, 5 Drawing Figures

3,854,143

SHUTTER OPERATING MECHANISM

BACKGROUND OF THE INVENTION

This invention relates generally to camera shutters and more particularly to a new and improved shutter operation mechanism for opening and closing the shutter.

Heretofore camera shutters have been constructed with a multiplicity of actuated levers and elements. These levers and other elements are disposed in arrangements in which the shutter-operating mechanism they constitute is relatively bulky and complex.

SUMMARY OF THE INVENTION

It is a principal object of the present invention to provide a new and compact shutter-operating mechanism.

Another object is to provide a shutter-operating mechanism in which the lever elements thereof have a planetary gear wheel-like mode of operation with a minimum space and the sliding contacts of the levers is decreased to a minimum reducing the loss of force due to friction as far as possible.

The shutter according to the invention has a plurality of shutter blades for opening and closing the shutter and are operated by an open-and-close actuating lever. The actuating lever is pivotally mounted on a pivot coaxially with a holding lever. A driving cam is pivotally mounted on a pin on the actuating lever and actuates the actuating lever for opening and closing the shutter exposure aperture.

The holding lever has a magnetizable iron piece thereon that is attracted by an electromagnet that controls the exposure time. This holding lever has a cammed surface cammed by the driving cam for positioning the holding lever in position placing the iron piece in contact with the electromagnet for magnetic attraction thereof when the electromagnet is energized.

The driving cam has a pin fixed thereon that cooperates with a projection on the holding lever, when it is being held by the electromagnet, to function as one fulcrum therefor and a projection on the driving cam cooperates with a stationary fixed pin that provides another fulcrum for the driving cam so that the two fulcra allow the pivot pin of the driving cam on the actuating lever to move axially in an elongated guide slot to thereby open the shutter aperture. When the electromagnet is de-energized upon completion of the exposure delay time, the iron piece is released and accordingly the holding lever is released and frees the fixed pin on the driving cam so that the latter executes pivotal movement on the stationary fixed pin and moves in a direction for driving the actuating lever in a direction for closing the shutter blades.

During the opening and closing movements of the shutter blades a condition exists between the fully opened and fully closed condition of the shutter, in which the pivot of the actuating lever, the two fulcra, the pivot of the driving cam will lie substantially in a common plane whereby the friction losses therebetween are reduced.

BRIEF DESCRIPTION OF THE DRAWINGS

Other features and advantages of the shutter-operating mechanism in accordance with the present invention will be better understood as described in the following specification and appended claims in conjunction with the drawings in which:

DESCRIPTION OF THE PREFERRED EMBODIMENTS

Figure 1:
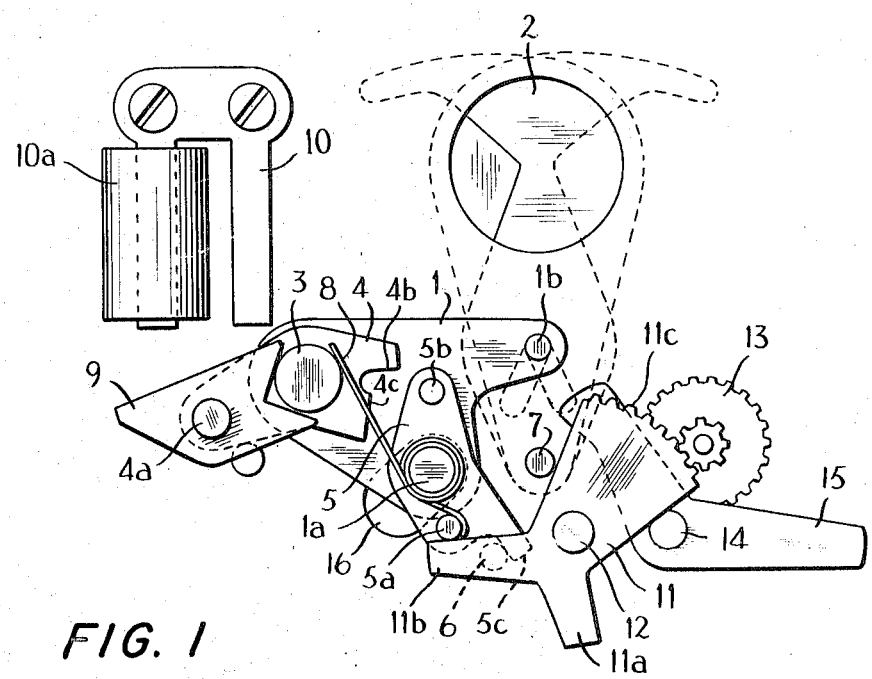
FIG. 1 is diagrammatic elevation view of a shutter having a shutter-operating mechanism according to the invention illustrating the shutter in a closed condition and not yet cocked.
Figure 3:
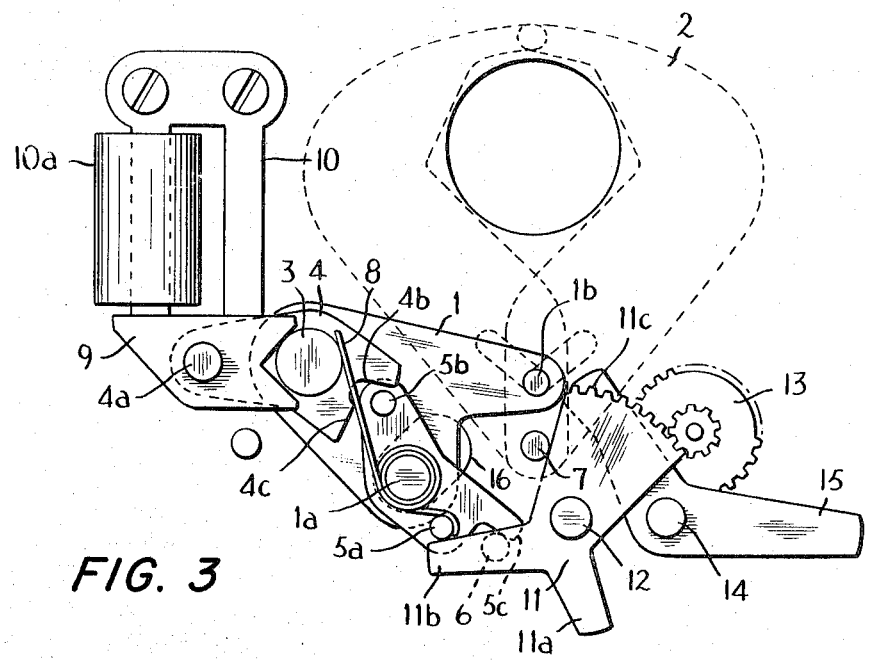
FIG. 3 is a diagrammatic elevation view of the shutter in FIG. 2 in an open condition for taking of a photographic exposure.

The camera shutter embodying the invention is illustrated in the drawings as comprising an open-and-close lever 1 for actuating a plurality of shutter blades 2 from a closed position closing the shutter exposure aperture as shown in FIG. 1 to a shutter-opening position illustrated in FIG. 3. The open-and-close lever pivots about a pivot 3 on which is pivotally mounted a holding lever 4 coaxially therewith. A driving lever or cam 5 is pivotally supported on a pivot pin 1a carried by the open-and-close lever 1 which has an actuating pin 1b engaged in elongated slots in the shutter blades for oscillating the shutter blades 2 to their two operative positions closing and opening the shutter exposure aperture.

The driving cam 5 has two spaced, pins 5a, 5b. The driving cam 5 has a locking projection 5c that coacts with a stationary fixed fulcrum pin 6, as later described, as it effects driving of the shutter blades 2 about a pivot pin 7. A biasing spring 8 is wound about pivot 1a of the driving cam and bears on one pin 5a of this cam and on fixed pivot 3 to apply a biasing force to the driving cam 5 in a clockwise direction. The holding lever 4 transports a magnetically attractable iron piece 9 supported on a pivot 4a. This iron piece 9 is attracted and releasably held by an electromagnet 10 having an energizing coil 10a maintaining the holding lever in the position illustrated in FIG. 2.

A three-arm sector gear lever 11 is pivotally supported on a pivot 12 and has a first arm 11a that coacts with camera mechanism, not shown, for setting or cocking the shutter. A second arm 11b is constantly engaged with the first fixed pin 5a of the driving cam 5 and a third arm has a sector gear 11c that meshes with a pinion of a gear governor 13. The sector gear lever 11 is biased in a clockwise direction by a spring not shown.

In order to release the camera shutter for taking an exposure in known manner a two-arm release lever 15 is provided pivotally mounted on a fixed pivot 14. The release lever is biased in a counterclockwise direction by a biasing spring not shown.

The shutter is illustrated in an uncocked condition in FIG. 1. When the camera is cocked the cocking mechanism engages the arm 11a and rotates the gear sector lever 11, which functions as a setting or charging lever, in a clockwise direction. As the charging or cocking lever 11 rotates clockwise it rotates the driving cam or lever 5 in a counter clockwise direction through the fixed pin 5a thereon. This rotation of the driving cam takes place about its movable pivot 1a carried by the open-and-close lever 1. As the driving cam 5 is rotated its biasing or driving spring 8 is tensioned or charged. The second pin 5b on the driving cam moves past a projection 4b on the holding lever and cams a cammed surface on a second projection 4c on the holding lever so that the holding lever is rotated clockwise carrying the attractable iron piece 9 into abutment with the electromagnet 10 and principally the core of the energizing coil 10a.

Figure 2:
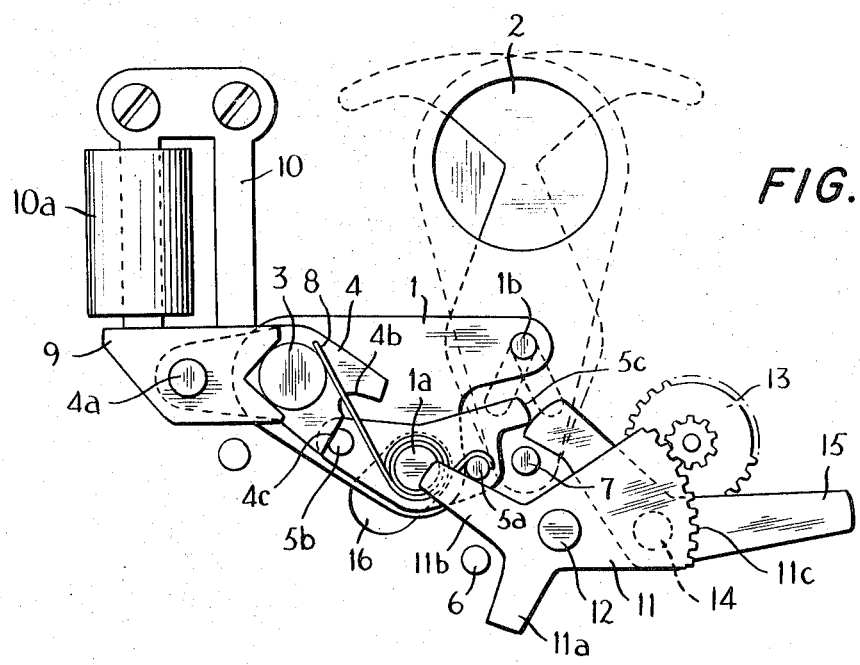
FIG. 2 is a diagrammatic elevation view of the shutter in FIG. 1 in a cocked condition.

As the driving cam 5 continues its counterclockwise rotation the locking projection 5c which has an arcuate tip surface cams into engagement with an arm of the release lever, which has an arcuate tip surface, and the release lever releasably locks the shutter in a cocked condition illustrated in FIG. 2. The second pin 5b on the driving cam engages the tip surface of the projection 4c of the holding lever and which is tapered so that the iron piece 9 is moved and well seated against the electromagnet 10 and the rotation of the holding lever 4 ceases. In the course of the shutter cocking operation the shutter open-and-close lever 1 has a counterclockwise rotation force applied thereto through the driving cam pivot 1a thereon. Since this force is in a direction towards further closing the shutter blades the shutter blades will not open unexpectedly during the setting or cocking operation. The movement of the shutter open-and-close lever 1 is limited by a guide slot 16 within which the driving cam pivot pin 1a is disposed for movement therein.

The camera, not shown, may be provided with control circuitry for energizing the electromagnet 10 when a camera release lever, not shown, is operated for taking a photographic exposure. The control circuitry may be provided with a delay circuit for controlling the shutter closing as a function of the brightness of the object or field being photographed. In any event when the camera release is actuated the mechanism engages the free arm of the two-arm release lever 15 and rotates it clockwise releasing the driving cam 5 for rotation rapidly on its pivot 1a under control of its driving spring 8. Since the electromagnet is in an energized condition attractable or magnetizable iron piece 9 is held by the electromagnet and the holding lever 4 is held in position so that the continued movement of the driving lever 5 is impeded.

The driving cam 5 strives to rotate against this situation under control of its driving spring and its locking projection 5c engages the fulcrum 6 and the second pin 5b thereof engages the projection 4b of the holding lever so that two fulcra 5b, 6 are provided and the driving cam pivot 1a is biased in the slot 16 and the open-and-close lever is rotated clockwise about its pivot 3. The clockwise rotation or oscillation of the open-and-close lever moves its pin 1b which opens the shutter blades as shown in FIG. 3 and an exposure is taken.

During the shutter-opening operation the first pin 5a of the driving cam engages the second arm 11b of the sector gear lever 11 and rotates it counterclockwise so that the internal friction of the governor 13 controls the speed of the opening of the shutter blades thereby controlling the iris. A delay circuit in the control circuit will control the exposure delay as a function of the brightness of the field of the exposure in the conventional manner.

Those skilled in the act will understand that the governor 13 may be eliminated in which case the sector gear 11a is not needed, and the shutter blades are then rapidly opened during the shutter opening operation. The iris is then separately controlled.

In the fully opened condition of the shutter illustrated in FIG. 3 the locking projection 5c of the driving cam is fulcrumed on the fulcrum 6 and the second pin 5b engages the projection 4b of the holding lever so that the driving cam can rotate no further and the angular movement of the open-and-close lever 1 is limited by the elongated slot 16. The shutter is in readiness for automatic control of the closing to control the exposure time. The control circuit not shown, will develop a trigger signal effecting de-energization of the operating coil 10a so that the electromagnet loses its attractive force and the holding lever 4 is released. The driving cam 5 will be rotated clockwise by its biasing or driving spring whereby its second pin 5b rotates the holding lever 4 counterclockwise separating the iron piece 9 from the electromagnet. Since the rotation of the holding lever eliminates fulcrum 4b the remaining fulcrum 6 provides the pivot for the driving cam so that its axis of rotation or pivot pin 1a is shifted in an opposite direction in the elongated guide slot 16 to its position illustrated in FIG. 1. As the pivot pin 1a of the driving cam 5 is shifted in its guide slot 16 the open-and-close lever is rotated in a counterclockwise direction so that the shutter-operating pin 1b actuates the shutter blades 2 in a shutter-closing direction and the shutter parts are restored to the condition illustrated in FIG. 1 in readiness for recocking of the shutter.

Figure 4:
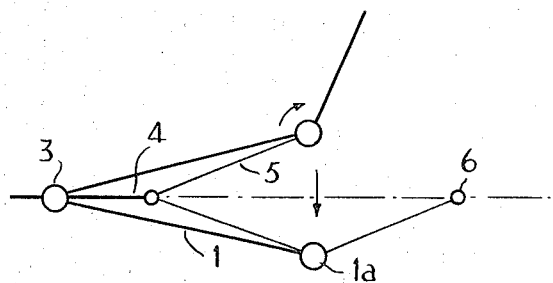
FIGS. 4 and 5 are lever diagrams for illustrating the movement of the elements of the shutter-operating mechanism of the invention during the opening and closing movements respectively.

The movement of the shutter levers in the shutter-opening operation are illustrated diagrammatically in FIG. 4. The open-and-close lever 1 is shown pivoting on its pivot 3 and in the upper part of the diagram its position corresponds to its position in FIG. 1. The driving cam is illustrated as connected to its pivot 1a which is shown in the diagram, by an arrow, as moving from an upper position to a lower position. In carrying out the opening operation the driving cam is shown as a light line and rotating clockwise as shown by a heavy line and the arrow. An intermediate condition exists between the closed condition of the shutter and the open condition of the shutter during the shutter-opening movement in which the pivot shaft 3 of the open-and-close lever, the contact point between the projection 4b of the holding lever 4 and the second pin 5b of the driving cam 5, the pivot shaft 1a of the driving cam 5 the locking projection 5c of the driving cam and its fixed fulcrum pin 6 will lie substantially in a common plane. Due to this arrangement the deviation of the fulcrum 6 is a minimum. Moreover, this makes possible a minimum loss of force due to friction.

Figure 5:
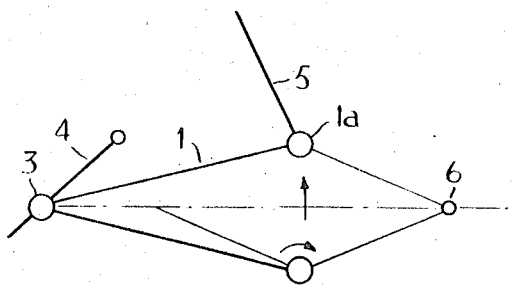

The lever diagram in FIG. 5 illustrates the shutter-closing operation. In this instance the open-and-close lever is shown first in the lower part of the diagram and the pivot pin 1a carried thereby. The holding lever is illustrated as swinging from the left to the right as shown by the arrow in the lower part of the diagram. The same intermediate point between the closed and open position is again shown and the same members pass through this common plane as before. The lever system illustrates the same levers in the upper part of the diagram when the closed condition of the shutter has been established.

Since the open-and-close lever 1 and the holding lever 4 are coaxially arranged the number of parts is reduced. Moreover, the arrangement of the members is such that the parts are superposed allowing the space occupied to be small and the shutter compact so that the camera can be light in weight.

Furthermore, the provision of the cammed projection 4c on the holding lever limits the rotation of the holding lever so that it does not rotate in excess even if the shutter is sought to be overcharged during cocking. Moreover, the interval or distance between the iron piece 9 and the electromagnet does not change. The amount of the charging by the shutter-charging or shutter-cocking mechanism is effected easily. The overall action of the shutter and the camera can be performed positively and effectively.

What we claim and desire to secure by letters patent is:

1. In a camera shutter having shutter blades, the combination of an actuating lever movable for moving the shutter blades between open and closed positions thereof; a pivot pivotally mounting said actuating lever; a driving lever pivotally mounted on said actuating lever; a holding lever pivotally mounted on said pivot, coaxially with said actuating lever; means for selectively cocking and uncocking said holding and driving levers; and means on said levers for enabling said driving lever (a) when it is uncocked, to drive said actuating lever in one direction about said pivot to open the shutter blades and (b) when the holding lever is uncocked, to drive said actuating lever in the opposite direction about said pivot to close the shutter blades.

2. A combination according to claim 1 including a fixed fulcrum adjacent said actuating lever; an additional fulcrum on said holding lever; and means for moving said driving lever, on uncocking thereof, onto said fulcra and for thereby moving said actuating lever, onto which said driving lever is pivoted, about said pivot for the moving of the shutter blades between their open and closed positions.

3. A combination according to claim 2 in which the actuating lever is movable about said pivot to move the point where the driving lever is pivoted to the actuating lever on a path across a straight line between said pivot and said fixed fulcrum, for the moving of the shutter blades between open and closed positions.

4. A combination according to claim 1 in which said driving lever includes camming means coactive with said holding lever for camming the holding lever to the cocked position thereof; the combination including means for releasably retaining the holding lever in said cocked condition.

5. A combination according to claim 4 in which said means releasably retaining the holding lever in said cocked condition comprises a release lever releasably locking said driving lever subsequent to the camming of said holding lever.

6. A combination according to claim 5 in which said holding lever has a nagnetizable element thereon and in which said means releasably retaining the holding lever in a cocked condition includes a selectively energizable electromagnet attracting said magnetizable element when energized.

* * * * *